(12) United States Patent
Cornea-Hasegan (10) Patent No.: US 7,912,890 B2
(45) Date of Patent: Mar. 22, 2011

(54) METHOD AND APPARATUS FOR DECIMAL NUMBER MULTIPLICATION USING HARDWARE FOR BINARY NUMBER OPERATIONS

(75) Inventor: Marius A. Cornea-Hasegan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1350 days.

(21) Appl. No.: 11/432,813

(22) Filed: May 11, 2006

(65) Prior Publication Data

US 2007/0266072 A1 Nov. 15, 2007

(51) Int. Cl.
 G06F 7/38 (2006.01)
 G06F 7/44 (2006.01)
 G06F 7/52 (2006.01)
(52) U.S. Cl. ......... 708/623; 708/495; 708/503; 708/625
(58) Field of Classification Search .......... 708/495–505, 708/623–624, 670, 680–685, 651–652
See application file for complete search history.

(56) References Cited

U.S. PATENT DOCUMENTS

| 7,069,289 | B2 * | 6/2006 | Steele, Jr. ...................... | 708/495 |
| 7,395,297 | B2 * | 7/2008 | Steele, Jr. ...................... | 708/525 |
| 7,519,645 | B2 | 4/2009 | Carlough et al. | |
| 7,519,647 | B2 * | 4/2009 | Carlough et al. ............. | 708/623 |
| 7,546,328 | B2 * | 6/2009 | Schulte et al. ................ | 708/505 |
| 7,577,699 | B2 * | 8/2009 | Denk et al. .................... | 708/550 |
| 2007/0233774 | A1 * | 10/2007 | Tang et al. .................... | 708/650 |
| 2007/0266073 | A1 | 11/2007 | Cornea-Hasegan .......... | 708/680 |

OTHER PUBLICATIONS

Gonzalez-Navarro, S.; Tsen, C.; Schulte, M., "A Binary Integer Decimal-based Multiplier for Decimal Floating-Point Arithmetic," Conference Record of the Forty-First Asilomar Conference on Signals, Systems and Computers, pp. 353-357, Nov. 2007.*
Tsen, C.; Schulte, M.; Gonzalez-Navarro, S., "Hardware Design of a Binary Integer Decimal-based IEEE P754 Rounding Unit," IEEE International Conf. on Application-specific Systems, Architectures and Processors, pp. 115-121, Jul. 2007.*
Intel Inc., "Reference Software Implementation of the IEEE 754R Decimal Floating-Point Arithmetic", retrieved from http://cache-www.intel.com/cd/00/00/29/43/294339_294339.pdf.*
Marius Cornea and Cristina Anderson, "Software Implementation of the IEEE 754R Decimal Floating-Point Arithmetic," in Proceedings, Real Numbers and Computers Conference, 2006.*
European Patent Office, Search Report issued in connection with the corresponding EP Application No. 07251933.3, 7 pages, Nov. 11, 2008.

(Continued)

*Primary Examiner* — Chat C Do
*Assistant Examiner* — Matthew Sandifer
(74) *Attorney, Agent, or Firm* — Trop, Pruner & Hu, P.C.

(57) ABSTRACT

According to embodiments of the subject matter disclosed in this application, decimal floating-point multiplications and/or decimal fixed-point multiplications may be implemented using existing hardware for binary number operations. The implementation can be carried out in software, in hardware, or in a combination of software and hardware. Pre-calculated constants that are approximations to negative powers of 10 and stored in binary format may be used for rounding multiplication results to a designated precision by multiplying the results with a pre-calculated constant. Additionally, several parts of a decimal multiplication may be carried out in parallel. Furthermore, a simple comparison with a constant instead of an expensive remainder calculation may be used for midpoint detection and exactness determination.

24 Claims, 5 Drawing Sheets

OTHER PUBLICATIONS

Ref1-Anonymous: "Draft Standard for Floating-Point Arithmetic P754/D0.17.4—May 9, 2006 15:13" [Online] May 9, 2006 IEEE, Piscataway, NJ, USA, XP002498605 Retrieved from the Internet: URL:754r.ucbtest.org/drafts/archive/2006-0 5-09.pdf> [retrieved on Oct. 6, 2008] pp. 8,40,211 pp. 126-143.

Ref1-Anonymous: "Index of /drafts/archive" [Online] 2006, IEEE, XP002498606 Retrieved from the Internet: URL:754r.ucbtest.org/drafts/archive> [retrieved on Oct. 8, 2008].

Ref2-K. DUKE: "Decimal Floating Point Processor. Nov. 1969." IBM Technical Disclosure Bulletin, vol. 12, No. 6, Nov. 1, 1969, p. 862, XP002498604 New York, US.

Ref3-Liang-Kai Wang et al: "Decimal floating-point division using newton-raphson iteration" Application-Specific Systems, Architectures and Processors, 2004. Proc eeings. 15th IEEE International Conference on Galveston, TX, USA Sep. 27-29, 2004, Piscataway, NJ, USA,IEEE, Sep. 27, 2004, pp. 84-95, XP010730170 ISBN: 978-0-7695-2226-5.

Ref4-Johnstone P et al: "Higher radix floating point representations" Computer Arithmetic, 1989., Proceedings of 9th Symposium on Santa Monica, CA, USA Sep. 6-8, 1989, Washington, DC, USA, IEEE Comput. Soc. PR, US, Sep. 6, 1989, pp. 128-135, XP010033234 ISBN: 978-0-8186-8963-5.

European Patent Office, Communication Pursuant to Article 94(3) EPC, dated Feb. 25, 2009 in a related application.

Anonymous, "Draft Standard For Floating-Point Arithmetic P754/D0.17.4-May 9, 2006 15:13," pp. 1-248.

K. Duke, "Decimal Floating Point Processor," Nov. 1969, IBM Technical Disclosure Bulletin, vol. 12, No. 6, Nov. 1, 1969, p. 862.

Mark A. Erle, et al, "Decimal Multiplication With Efficient Partial Product Generation," 2005, pp. 1-8.

Pending U.S. Appl. No. 11/133,811, filed May 19, 2005, Inventor: Marius A. Cornea-Hasegan.

Hollasch: IEEE Standard 754 Floating Point Numbers; ret'd from the web http://steve.hollasch.net/cgindex/coding/ieeefloat.html; last update Dec. 4, 2001; 7 pages.

U.S. Patent and Trademark Office, Office Action issued on Dec. 29, 2009 ,with Reply to Office Action filed on Mar. 29, 2010 in U.S. Appl. No. 11/432,808.

European Patent Office, Communication Pursuant to Article 94(3) EPC dated Jan. 19, 2010 in European patent application No. 07 251 933.1-1229.

Gerd Bohlender, "Decimal Floating-Point Arithmetic In Binary Representation," 1991, pp. 1-15.

* cited by examiner

FIGURE 5

METHOD AND APPARATUS FOR DECIMAL NUMBER MULTIPLICATION USING HARDWARE FOR BINARY NUMBER OPERATIONS

BACKGROUND

1. Field

This disclosure relates generally to processor systems, and more specifically but not exclusively, to methods and apparatus for arithmetic operations performed by processors.

2. Description

Decimal floating-point multiplications are typically implemented in software because there is no specialized hardware for decimal floating-point multiplications in most modern processors. A floating-point number (D) is normally represented by a coefficient (C) and an exponent (E), i.e., $D=C\cdot 10^E$, where both C and E are decimal integers. The precision of such a representation may be determined by the number of decimal digits in C, with more decimal digits in C resulting in more precise representation of D. Assume that coefficients and exponents of decimal floating-point numbers are stored in a binary format in a computer. A typical process for calculating a multiplication between two decimal floating-point numbers (e.g., $D1=C1\cdot 10^{E1}$, and $D2=C2\cdot 10^{E2}$) is as follows: convert coefficients (C1 and C2) and exponents (E1 and E2) from binary to decimal; perform a decimal integer multiplication between C1 and C2 and a decimal integer addition between E1 and E2; round exact decimal results (C1·C2 and E1+E2) correctly to the destination precision; and then convert the coefficient and exponent of the final results from decimal back to binary.

Although it would be possible to store coefficients and exponents of decimal floating-point numbers in a decimal format (e.g., Binary-Coded Decimal (BCD) format) all the time, then the advantage offered by existing instructions or circuitry that operate on binary numbers could not be taken of directly. In the above process for decimal floating-point multiplication, conversion back and forth between decimal and binary formats and decimal integer multiplication and addition consume a number of clock cycles. More importantly, the rounding operation for the final results, which typically uses remainder-based calculation, is very expensive in terms of clock cycles. Thus, it is desirable to have faster approaches for decimal floating-point multiplications so that the overall performance of a computing system can be improved.

BRIEF DESCRIPTION OF THE DRAWINGS

The features and advantages of the disclosed subject matter will become apparent from the following detailed description of the subject matter in which.

DETAILED DESCRIPTION

According to embodiments of the subject matter disclosed in this application, decimal floating-point multiplications and/or decimal fixed-point multiplications may be implemented using existing hardware for binary number operations. The implementation can be carried out in software (e.g., using machine instructions for the existing underlying hardware for binary operations), in hardware (e.g., re-using existing circuitry for operations on binary numbers), or in a combination of software and hardware. Particularly, pre-calculated constants that are approximations to negative powers of 10 and stored in binary format may be used for rounding multiplication results to a designated precision. As a result, a rounding operation may be implemented as a multiplication between multiplication result and a pre-calculated constant. Additionally, several parts of a decimal multiplication may be carried out in parallel. Furthermore, a simple comparison with a constant instead of an expensive remainder calculation may be used for determining whether a multiplication result is a midpoint between two consecutive decimal floating-point numbers (for multiplications with rounding to the nearest number within the pre-determined precision) and determining whether the rounded result is an exact representation of the real multiplication result.

Reference in the specification to "one embodiment" or "an embodiment" of the disclosed subject matter means that a particular feature, structure or characteristic described in connection with the embodiment is included in at least one embodiment of the disclosed subject matter. Thus, the appearances of the phrase "in one embodiment" appearing in various places throughout the specification are not necessarily all referring to the same embodiment.

Figure 1:
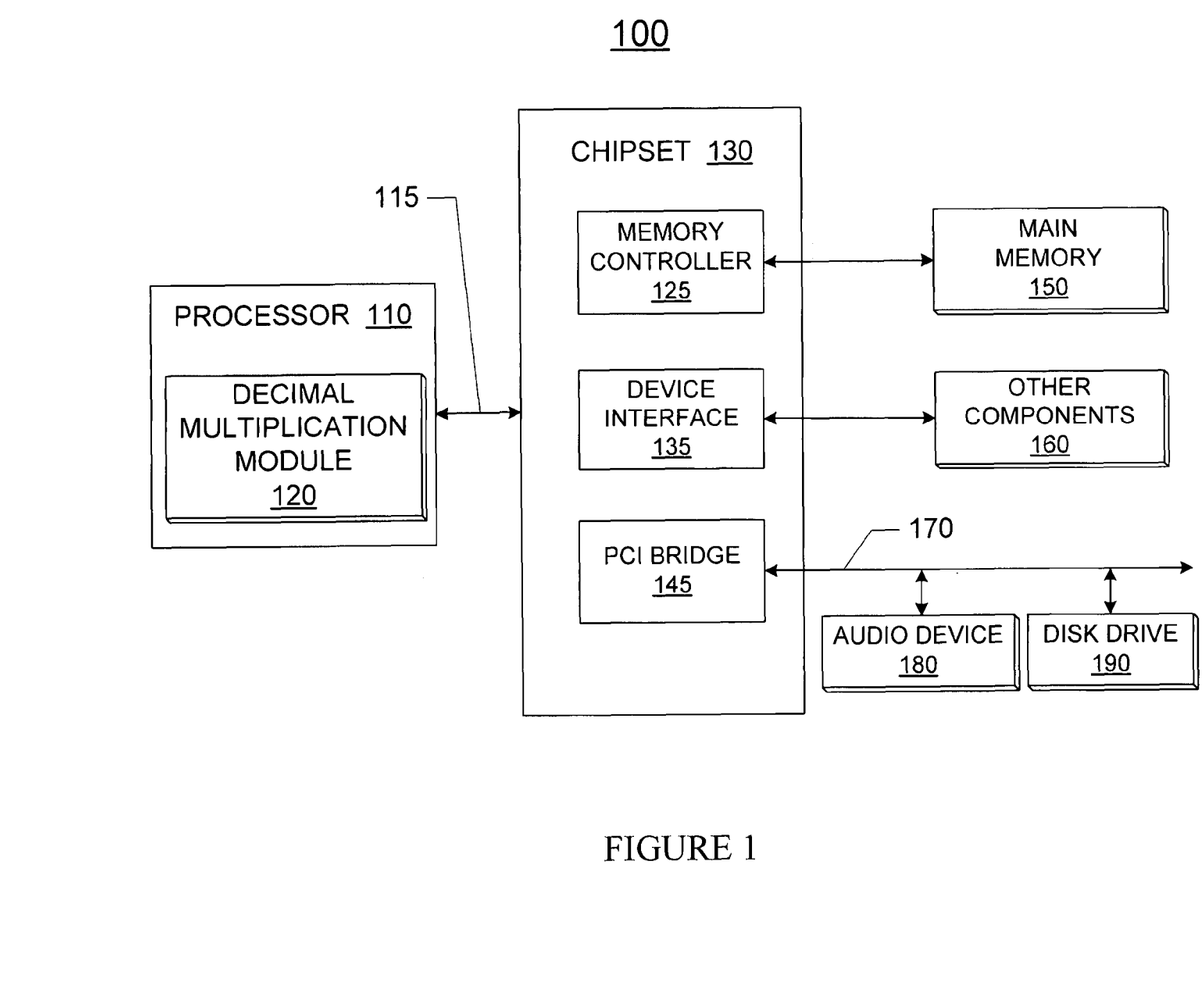
FIG. 1 shows one example computing system where decimal number multiplications may be performed using hardware for binary number operations, according to the disclosed subject matter in the present application.

FIG. 1 shows one example computing system 100 where decimal number multiplications may be performed using hardware for binary number operations. Computing system 100 may comprise one or more processors 110 coupled to a system interconnect 115. Processor 110 may include one or more processing cores. At least one processing core may have a decimal multiplication module 120 that uses existing hardware for binary number operations. The decimal multiplication module may be implemented in hardware (e.g., as a part of the arithmetic and logic unit (ALU)) by re-using existing circuitry for binary number operations, in software by using instructions for the existing underlying binary hardware, or in a combination of hardware and software.

The decimal multiplication module may use pre-calculated binary approximations to certain negative powers of 10 and store these pre-calculated binary numbers as constants in a table. When rounding a multiplication result to a pre-determined precision, a pre-calculated constant corresponding to the pre-determined precision may be looked up in a table and used to multiply with the multiplication result. Using these pre-calculated constants, the conventional expensive division operations are replaced with less expensive binary multiplication operations. Additionally, several parts of a decimal multiplication may be carried out in parallel. Moreover, midpoint detection (i.e., determining whether a multiplication result is a midpoint between two consecutive decimal floating-point numbers for multiplications with rounding to the nearest number within the pre-determined precision) and exactness detection of the final multiplication results may be performed by using a simple comparison with a constant instead of more expensive remainder calculations.

The computing system 100 may also include a chipset 130 coupled to the system interconnect 115. Chipset 130 may include one or more integrated circuit packages or chips. Chipset 130 may comprise one or more device interfaces 135 to support data transfers to and/or from other components 160 of the computing system 100 such as, for example, BIOS firmware, keyboards, mice, storage devices, network interfaces, etc. Chipset 130 may be coupled to a Peripheral Component Interconnect (PCI) bus 170. Chipset 130 may include a PCI bridge 145 that provides an interface to the PCI bus 170. The PCI Bridge 145 may provide a data path between the processor 110 as well as other components 160, and peripheral devices such as, for example, an audio device 180 and a disk drive 190. Although not shown, other devices may also be coupled to the PCI bus 170.

Additionally, chipset 130 may comprise a memory controller 125 that is coupled to a main memory 150. The main memory 150 may store data and sequences of instructions that are executed by the processor 110 or any other device included in the system. The memory controller 125 may access the main memory 150 in response to memory transactions associated with the processor 110, and other devices in the computing system 100. In one embodiment, memory controller 150 may be located in processor 110 or some other circuitries. The main memory 150 may comprise various memory devices that provide addressable storage locations which the memory controller 125 may read data from and/or write data to. The main memory 150 may comprise one or more different types of memory devices such as Dynamic Random Access Memory (DRAM) devices, Synchronous DRAM (SDRAM) devices, Double Data Rate (DDR) SDRAM devices, or other memory devices.

Although FIG. 1 shows one example computing system, the decimal multiplication module may be used in any processing unit of any system. For example, the decimal multiplication module may be used in a symmetric multiprocessor system (SMP), a chip multiprocessor system (CMP), or any other multiprocessor systems.

In the following description, a decimal floating-point multiplication is used for illustration purposes, but the subject matter disclosed in this application is not limited to decimal floating-point multiplications. A person of ordinary skill in the art can easily understand that the disclosed subject matter also applies to decimal integer multiplications and decimal fixed-point multiplications. The Institute of Electrical and Electronics Engineers (IEEE) has a standard 754-1985 for binary floating-point arithmetic that is being revised. A new revision to IEEE standard 754 is proposed to add definitions of decimal floating-point arithmetic. The proposal (IEEE 754R) defines three decimal floating-point formats with sizes of 32, 64, and 128 bits and respective precisions of p=7, p=16, and p=34 decimal digits. Additionally, it is assumed that the decimal numbers have their coefficients and exponents stored in a binary format (even if coefficients and exponents are stored in a decimal format, they can be efficiently converted to binary by taking advantage of available instruction-level parallelism). The subject matter disclosed in this application can be used by IEEE 754R, but it is not limited to or by IEEE 754R.

A decimal floating-point number D is typically represented as $D=\pm C \cdot 10^E$, where C is a positive integer having at most p decimal digits and E is an integer exponent. It is further assumed that two decimal floating-point operands $D1=C1 \cdot 10^{E1}$ and $D2=C2 \cdot 10^{E2}$ are positive with coefficients having at most p decimal digits which are stored as binary integers. For negative numbers (D1 and/or D2), the rules governing their multiplication can be derived directly from those governing two positive number multiplication as described below.

Figure 2:
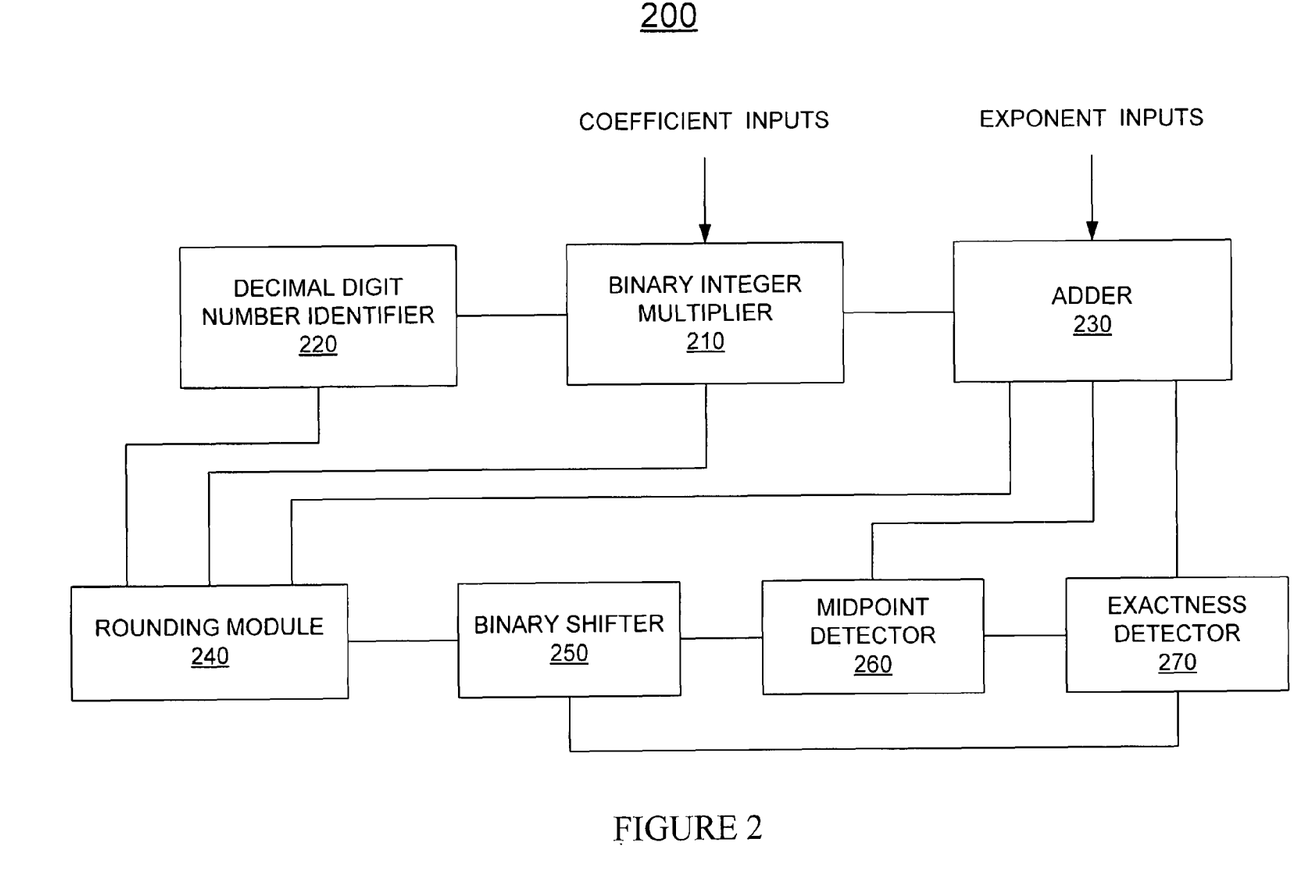
FIG. 2 is a block diagram of an example decimal multiplication module that performs decimal number multiplications with rounding to the nearest number within the pre-determined precision using hardware for binary number operations, according to the disclosed subject matter in the present application.

FIG. 2 is a block diagram of an example decimal multiplication module 200 that performs decimal number multiplications with rounding to the nearest number within the pre-determined precision using hardware for binary number operations, according to the subject matter disclosed in the present application. The decimal multiplication module may comprise at least one binary integer multiplier 210, a decimal digit number identifier 220, at least one binary integer adder 230, a rounding module 240, a binary shifter 250, a midpoint detector 260, and an exactness detector 270. Although not shown in this figure, the decimal multiplication module may also comprise a decimal-to-binary converter to convert a number from a decimal format to a binary format and/or a binary-to-decimal converter to convert a number from a binary format to a decimal format.

Binary integer multiplier 210 first receives binary coefficients (C1 and C2) of two input operands and performs a binary multiplication, $C'=C1 \cdot C2$. The binary integer multiplier then passes the result of the multiplication, C', to decimal digit number identifier 220 which determines the number of decimal digits in C'. Since the number of decimal digits in a number is closely correlated with the number of valid binary digits in the number, decimal digit number determination may be achieved via a lookup table and simple comparisons if necessary. The lookup table may include corresponding relationships between the number of valid binary digits and the number of decimal digits in a number. For example, a number with 6 binary valid digits (i.e., from 100000 to 111111) has 2 decimal digits. If C' has 6 binary digits, a simple table lookup will tell the number of decimal digits that C' may have. However, a number with 4 binary valid digits (i.e., from 1000 to 1111) may have 1 or 2 decimal digits. Thus, if C' has 4 valid binary digits, a simple table lookup is not sufficient to determine the number of decimal digits in C'. In this case, a simple comparison in addition to table lookup may be needed. Table lookup will tell that C' has either 1 or 2 decimal digits; then the result is further compared with binary number "1001." If C' is smaller than or equals to "1001," C' has 1 decimal digit; otherwise, C' has 2 decimal digits.

After the number of decimal digits in C', q, is determined by decimal digit number identifier 220, C' may be rounded to a pre-determined precision p by rounding module 240. First, q is compared with p. If q is not larger than p, no rounding is needed and the product of D1 and D2 will be $D=C' \cdot 10^E$, where E (=E1+E2) is obtained by adder 230. Since no rounding is performed, D is the exact representation of the product of D1 and D2. If q is larger than p, the rounding module computes the difference (x) between q and p, i.e., x=q−p, (this may be performed by the binary integer adder). The rounding module may obtain binary representations of $10^{(-x)}$ and $(\frac{1}{2} \cdot 10^x)$ by looking up the table. Rounding of C' may be done using Property 1 from U.S. patent application Ser. No. 11/133,811, which is incorporated by reference herein in its entirety. For convenience of description, this property is summarized below.

Property 1

Let $C \in N$ be a number in base $b = 2$, and $d_0 \cdot 10^{(q-1)} + d_1 \cdot 10^{(q-2)} + d_2 \cdot 10^{(q-3)} + \ldots + d_{(q-2)} \cdot 10^1 + d_{(q-1)}$ be its representation in base $B = 10$, where $d_0, d_1, \ldots d_{(q-1)} \in \{0, 1, \ldots, 9\}$, $d_0 \neq 0$.
Let $x \in \{1, 2, 3, \ldots, (q - 1)\}$ and $\rho = \ln 10/\ln 2 = \log_2 10$.
If $y \in N$, $y \geq \text{ceil}(\text{frac}(\rho \cdot x) + \rho \cdot q)$ and Kx is the value of $10^{-x}$ rounded up (toward positive infinity) to y bits:
$Kx = (10^{-x})_{Rp,y} = 10^{-x} \cdot (1 + \epsilon)$, with $0 < \epsilon < 2^{-(y+1)}$
then
$\text{floor}(C \cdot Kx) = d_0 \cdot 10^{(q-x-1)} + d_1 \cdot 10^{(q-x-2)} + d_2 \cdot 10^{(q-x-3)} + \ldots + d_{(q-x-2)} \cdot 10^1 + d^{(q-x-1)}$ Note:
In practice we may take $y = 1 + \text{ceil}(\rho \cdot q)$, which makes $0 < \epsilon < 2^{-\text{ceil}(\square - q)}$.

This property gives a precise way to "cut off" x decimal digits from the lower part of an integer C when its binary representation is available, thus avoiding the need to convert C to decimal, remove the lower x decimal digits, and then convert the result back to binary. For example, if the decimal number C=123456789 is available in binary and its six most significant decimal digits are required, Property 1 specifies precisely the constant $K3 \approx 10^{-3}$ so that floor $(C \cdot K3)$=123456 with certainty. The values of Kx can be pre-calculated. Thus, only a binary integer multiplication and a logical shift right are needed for this computation.

Assume further that the full integer product $C'=C1 \cdot C2$ requires q decimal digits to represent. Actual rounding to p decimal digits will be necessary only if $q \in [p+1, 2 \cdot p]$. In all rounding modes, we will use for this purpose the constant $Kx \approx 10^{-x}$, which is pre-calculated to y bits as specified in Property 1, where x=q−p. Since $q \in [p+1, 2 \cdot p]$ for situations where rounding is necessary, all cases are covered correctly if we choose $y=1+\text{ceil}(2 \cdot \rho \cdot p)$. The pre-calculated values Kx may be stored as pairs $(k_x, e_x)$ for all $x \in \{1, 2, \ldots, p\}$, where $k_x$ and $e_x$ are positive integers with $Kx=k_x \cdot 2^{(-e_x)}$.

To round C' to the nearest integer with p decimal digits, the following operation is performed to C': $(C'+\frac{1}{2} \cdot 10^{\wedge}X) \cdot 10^{\wedge}(-x)$. Binary approximation for $10^{\wedge}(-x)$ may be pre-calculated according to Property 1 and stored in a table. Similarly, binary representation of $(\frac{1}{2} \cdot 10^{\wedge}x)$ may also be pre-calculated and stored in a table. Rounding module 240 may look up in tables for binary representations for $10^{\wedge}(-x)$ and $(\frac{1}{2} \cdot 10^{\wedge}x)$. The rounding module may pass C' and the binary representation of $(\frac{1}{2} \cdot 10^{\wedge}x)$ to adder 230 which adds them together to produce a sum $C''=C'+(\frac{1}{2} \cdot 10^{\wedge}x)$. Binary integer multiplier 210 may then multiply C'' and Kx to produce a product C* ($=C'' \cdot Kx$) for binary shifter 250. The binary shifter shifts C* to right by $e_x$ bits to produce a floor number $C=\text{floor}(C^*)$ and a factional number $f^*=\text{frac}(C^*)=C^*-\text{floor}(C^*)$. For example, floor (15.2)=15, frac(15.2)=0.2; floor(−15.2)=−16, frac(−15.2)=−15.2−floor(15.2)=0.8.

Midpoint detector 260 may detect whether C' is a midpoint between two consecutive decimal floating-point numbers. This can be done by calculating a remainder $R=C'-C \cdot 10^{\wedge}x$ and by comparing R with $\frac{1}{2} \cdot 10^{\wedge}x$. If $R=\frac{1}{2} \cdot 10^{\wedge}x$, then C' is a midpoint and should be rounded to the nearest even decimal floating-point number according to some standards such as the IEEE 754R specification. The calculation of a remainder, however, is a fairly costly operation. According to an embodiment of the subject matter disclosed in this application, remainder calculation may be avoided and instead a single comparison to a pre-calculated constant, $10^{\wedge}(-p)$, may be used. Specifically, the midpoint detector may compare f* with 0 and $10^{\wedge}(-p)$. If f* is larger than 0 but smaller than $10^{\wedge}(-p)$ and if C is odd, then the midpoint detector decrements C by 1 so that C' is rounded to the nearest even number; otherwise, C' is rounded correctly and no adjustment of C by the midpoint detector is necessary. After midpoint detection and if needed, adjustment of C, adder 230 may add E1, E2, and x together to produce a corresponding exponent, E, for coefficient C, i.e., E=E1+E2+x. At this point, a rounded multiplication product of D1 and D2, D, may be obtained with coefficient C and exponent E, i.e., $D=C \cdot 10^{\wedge}E$.

In certain situations, it may be necessary to inform a user whether E is an exact representation of the real product of D1 and D2. If $q \geq p+1$, E is inexact unless the x decimal digits removed from the lower part of C* are all zeros. One approach to determine whether E is exact is to compare remainder R above with 0. If R=0, E is exact; otherwise, it is not. Again the remainder calculation is fairly costly. According to an embodiment of the subject matter disclosed in this application, exactness detector 270 may use comparison operations to determine the exactness of D.

Since the value of C' is rounded to the nearest decimal number, it is possible that C, which results from C', may have (p+1) decimal digits rather than the pre-determined p digits. Thus, the exactness detector first determines whether $C=10^{\wedge}p$, i.e., whether there is rounding overflow. If $C=10^{\wedge}p$, C has (p+1) decimal digits. Then the exactness detector adjusts C to $10^{\wedge}(p-1)$ and accordingly increases E by 1. Second, the exactness detector determines whether $(f^*-\frac{1}{2})$ is larger than 0 but smaller than the pre-calculated constant, $10^{\wedge}(-p)$ (or whether f* is larger than $\frac{1}{2}$ but smaller than $(10^{\wedge}(-p)+\frac{1}{2})$). If it is, D is an exact representation of the real product of D1 and D2; otherwise, D is an inexact result.

Figure 3:
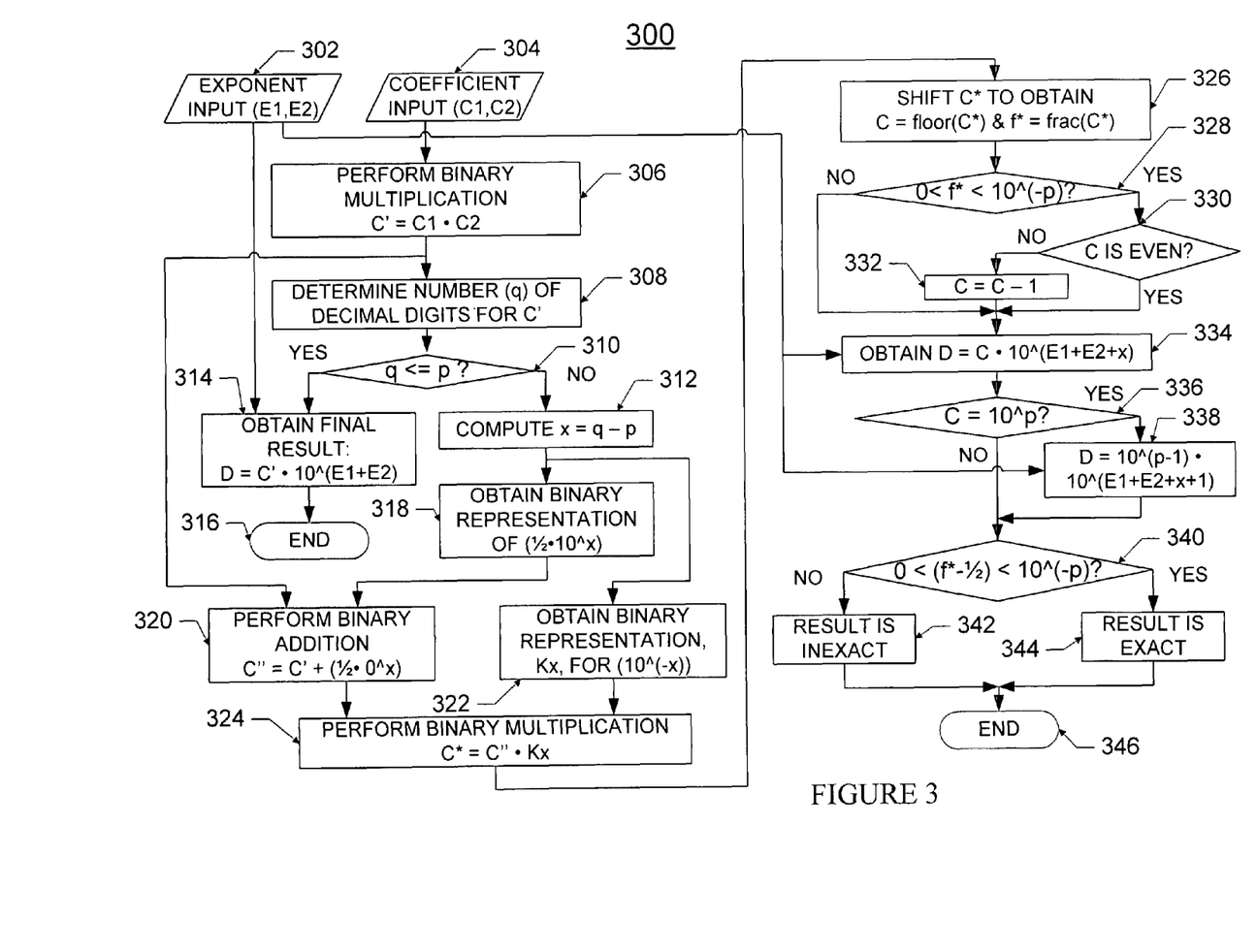
FIG. 3 is a flowchart illustrating an example process for performing decimal number multiplications with rounding to the nearest number within the pre-determined precision using hardware for binary number operations, according to the disclosed subject matter in the present application.

FIG. 3 is a flowchart illustrating an example process 300 for performing decimal number multiplications with rounding to the nearest number within the pre-determined precision using hardware for binary number operations, according to the subject matter disclosed in the present application. At block 302 two exponents, E1 and E2, may be received; and at block 304 two coefficients, C1 and C2, corresponding to E1 and E2, respectively, may be received. At block 306, a binary integer multiplication may be performed between C1 and C2 to produce a product C'. At block 308, the number of decimal digits in C', q, may be determined based on the number of binary digits in C' and if necessary, also by a comparison operation, as disclosed above along with FIG. 2. The corresponding relationship between the number of decimal digits and the number of binary digits in C' may be stored in a table.

At block 310, a comparison between q and the pre-determined precision p is made. If q<=p, no rounding is needed and a final multiplication result D (=D1·D2) may be obtained at block 314 with coefficient being C' and exponent being (E1+E2). This result D is an exact representation of the real multiplication product of D1 and D2. Process 300 may end at block 316. If q>p, x=q−p is calculated at block 312. At block 318, binary representation for ($\frac{1}{2} \cdot 10^{\wedge}x$) may be obtained by looking up a table that includes pre-calculated constants. At block 320, an addition, i.e., $C''=C'+(\frac{1}{2} \cdot 10^{\wedge}x)$, may be performed. While operations involved in blocks 318 and 320 are performed, binary representation for $Kx=10^{\wedge}(-x)$ may be obtained at block 322 by looking up a table that stores pre-calculated constants. At block 324, a binary integer multiplication, $C^*=C'' \cdot Kx$ may be performed. At block 326, C* may be shifted to right by $e_x$ bits to obtain a floor number C=floor(C*) and a fractional number $f^*=\text{frac}(C^*)$. Operations in blocks 312 and 318-326 together perform rounding operations for C' according to Property 1 as disclosed above.

A comparison may be made between 0, f*, and $10^{\wedge}(-p)$ at block 328 and a check whether C is even may be made at block 330, both for midpoint detection. If f* is larger than 0 but smaller than $10^{\wedge}(-p)$ and if C is odd, then the midpoint detector decrements C by 1 at block 332 so that C' is rounded to the nearest even number; otherwise, C' is rounded correctly and no adjustment of C is necessary. At block 334, a multiplication result of (D1·D2), after rounding and midpoint detection, may be obtained, i.e., D=C·10^(E1+E2+x). At block 336, whether C has more than p decimal digits after rounding may be detected by comparing C with 10^p. If C=10^p, C overflows after rounding and adjustments for C and E may be made at block 338, i.e., changing C from 10^p to 10^(p−1) and changing E from (E1+E2+x) to (E1+E2+x+1). At block 340, comparisons are made to determine whether D from block 334 or from block 338 is an exact representation of the real product D1·D2, i.e., whether x digits removed from the lower part of C* during rounding are all zeros. If (f*−½) is larger than 0 but smaller than 10^(−p) (or if f* is larger than ½ but smaller than (10^(−p)+½)), that result is exact may be outputted at block 344; otherwise, that result is inexact may be outputted at block 332. Process 300 may end at block 346.

Process 300 as shown in FIG. 3 for decimal floating-point multiplication in the round-to-nearest mode using hardware for binary number operations may be summarized as Property 2 below.

---

Property 2

C' = C1 · C2; /* binary integer multiplication */
q = the number of decimal digits required to represent C'; /* look up a table */
if q ≤ p, the result D = C' · 10^(E1+E2) is exact;
else /* for case where q ∈ [p+1, 2·p] */
{
    x = q − p; /* the number of decimal digits to be removed from the lower part of C', x ∈ [1, p] */
    C" = C' + (1/2 · 10^x); /*1/2 · 10^x is pre-calculated */
    Kx = 10^(−x) · (1 + ε), 0 < ε < 2^(−ceil(2·p·p)); /* pre-calculated as specified in Property 1) */
    C* = C" · Kx = C" · k_x · 2^(−e_x); /* binary multiplication with implied binary point */
    C = floor(C*); /* C has p decimal digits as rounded according to Property 1 */
    f* = frac(C*); /* f* consists of lower e_x bits of C* */
    if 0 < f* < 10^(−p), /* since C* = C" · K_x · 2^(−e_x), compare e_x bits shifted out of C* with 10^(−p)*/
    {
        if C is odd, C = C − 1;
    }
    D = C · 10^(E1+E2+x);
    if C = 10^p /* rounding overflow) */
        D = 10^(p−1) · 10^(E1+E2+x+1);
    if 0 < (f* − ½) < 10^(−p), the result is exact
    else the result is inexact;
}

---

Note that several parts of computations for Property 2 can be carried out in parallel, for example computation of C'=C1·C2 and E=E1+E2 can be carried out in parallel, and so can test for q≤p and computation of x=q−p; reading ½·10x and kx from tables; computation of C and f* and E=E1+E2+x; and tests for f*<10^(−p) and 0<f*−½<10^(−p).

Figure 4:
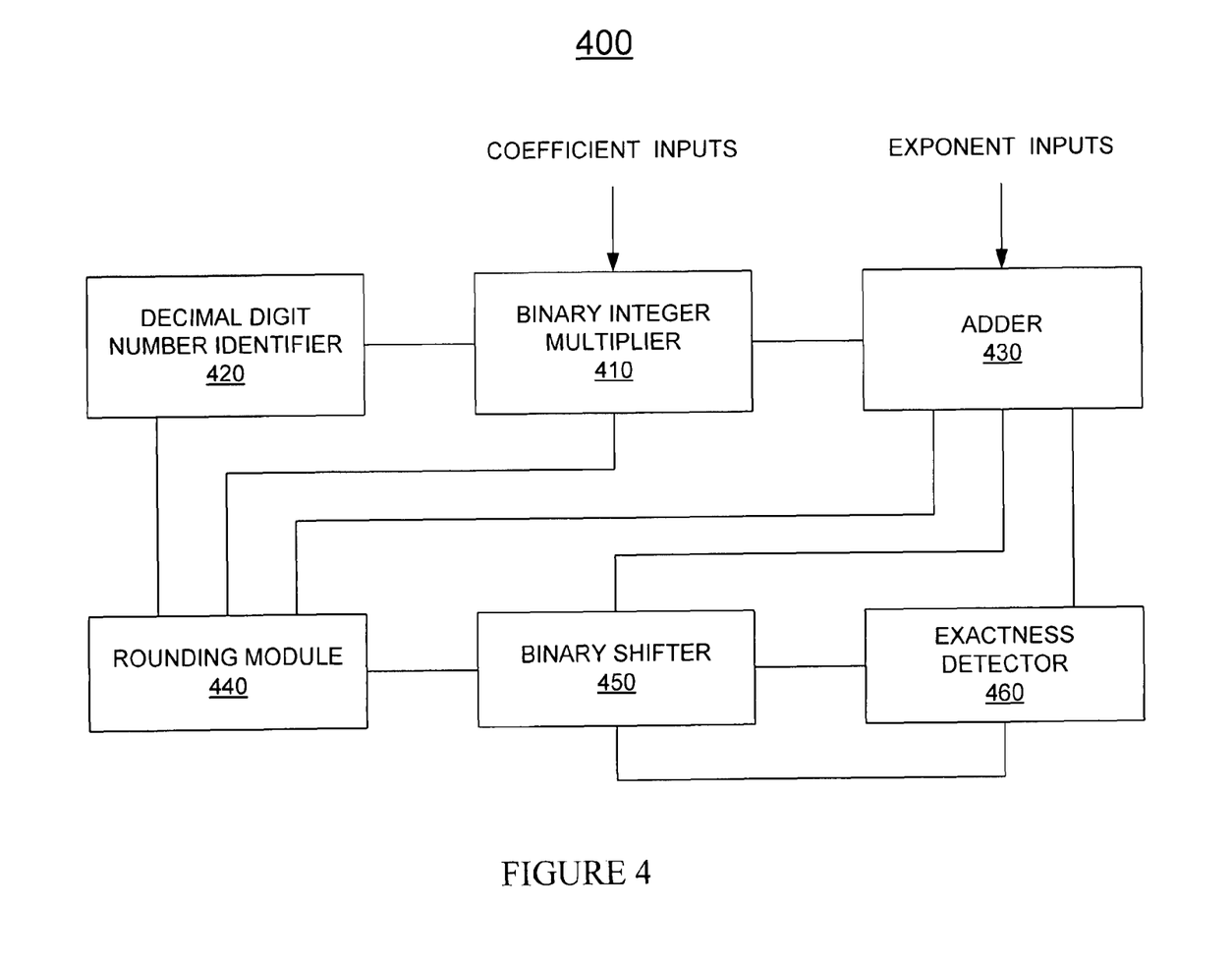
FIG. 4 is a block diagram of an example decimal multiplication module that performs decimal number multiplications with rounding down using hardware for binary number operations, according to the disclosed subject matter in the present application.

FIG. 4 is a block diagram of an example decimal multiplication module 400 that performs decimal number multiplications with rounding down using hardware for binary number operations, according to the subject matter disclosed in the present application. Decimal multiplication module 400 may comprise at least one binary integer multiplier 410, a decimal digit number identifier 420, at least one adder 430, a rounding module 440, a binary shifter 450, and an exactness detector 460. Although not shown in this figure, the decimal multiplication module may also comprise a decimal-to-binary converter to convert a number from a decimal format to a binary format and a binary-to-decimal converter to convert a number from a binary format to a decimal format.

Decimal multiplication module 400 works similarly to decimal multiplication module 200 as shown in FIG. 2, except that rounding module 440 and exactness detector 460 work differently from rounding module 240 and exactness detector 270, respectively, and there is no midpoint detector in decimal multiplication module 400. Since C' is rounded down, unlike rounding module 240, rounding module 440 does not need to obtain a binary representation for (½·10^x) and to obtain C"=C'+(½·10^x) from adder 430. Instead rounding module 440 directly passes Kx and C' to binary integer multiplier 410 to obtain C*=C'·Kx. Because C' is rounded down, there is no rounding overflow. Thus, unlike exactness detector 270, exactness detector 460 does not need to detect rounding overflow and perform adjustment to C and E accordingly if there is rounding overflow. Exactness detector 460 simply determines whether (f*−½) is larger than 0 but smaller than the pre-calculation constant, 10^(−p). If it is, D from rounding module 440 is an exact representation of the real product of D1 and D2; otherwise, D is an inexact result.

Figure 5:
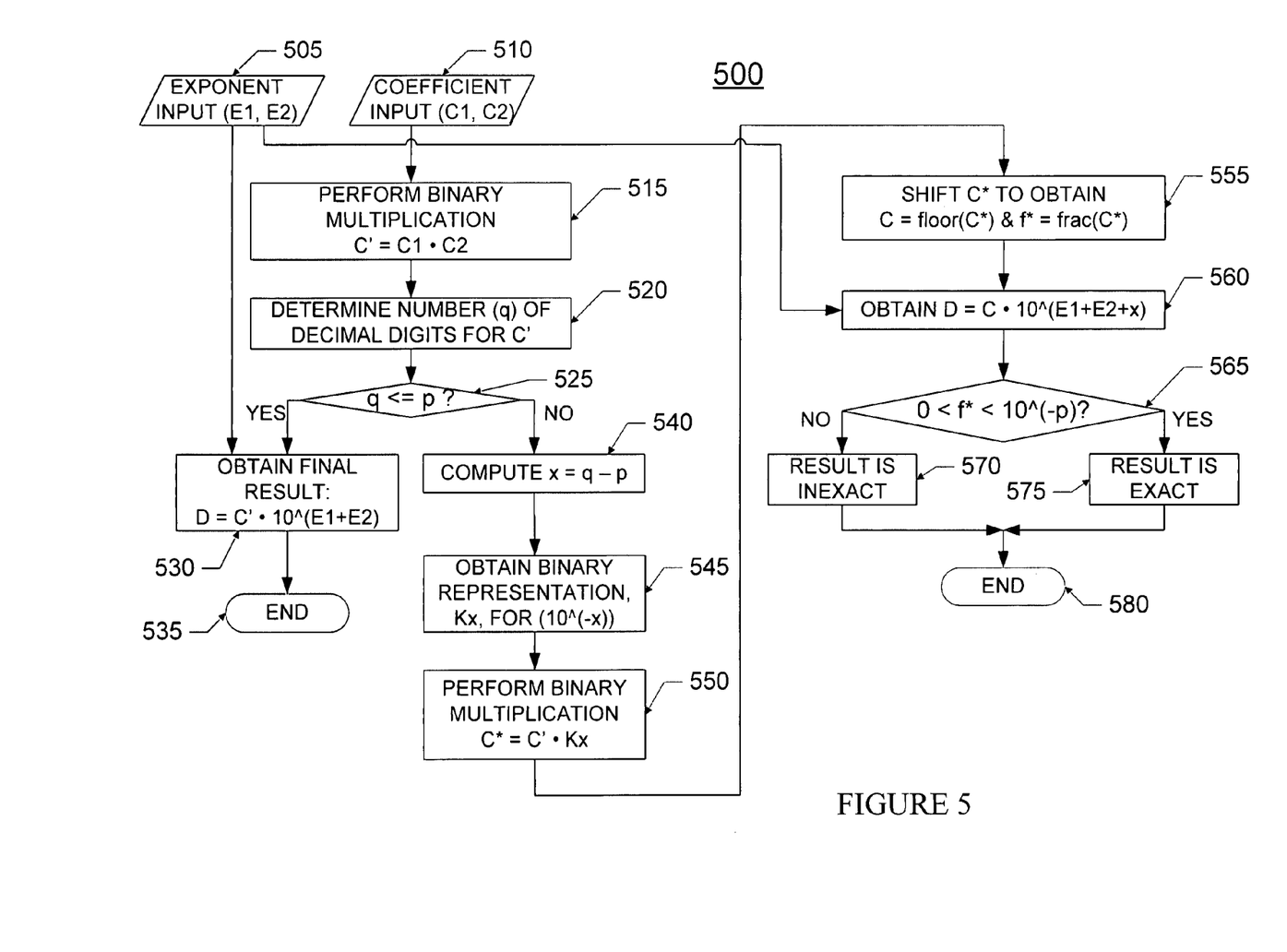
FIG. 5 is a flowchart illustrating an example process for performing decimal number multiplications with rounding down using hardware for binary number operations, according to the disclosed subject matter in the present application.

FIG. 5 is a flowchart illustrating an example process 500 for performing decimal number multiplications with rounding down using hardware for binary number operations, according to the subject matter disclosed in the present application. At block 505 two exponents, E1 and E2, may be received; and at block 510 two coefficients, C1 and C2, corresponding to E1 and E2, respectively, may be received. At block 515, a binary integer multiplication may be performed between C1 and C2 to produce a product C'. At block 520, the number of decimal digits in C', q, may be determined. At block 525, a comparison between q and p is made. If q<=p, no rounding is needed and a final exact multiplication result D (=D1·D2) may be obtained at block 530 with exponent being C' and exponent being (E1+E2). Process 500 may end at block 535. If q>p, x=q−p is calculated at block 540. At block 545, binary representation for Kx=10^(−x) may be obtained by looking up a table that stores pre-calculated constants. At block 550, a binary integer multiplication, C*=C'·Kx may be performed. At block 555, C* may be shifted to right by e_x bits to obtain a floor number C=floor(C*) and a fractional number f*=frac(C*). Operations in blocks 540-555 perform rounding operations for C' according to Property 1 as disclosed above.

At block 560, a multiplication result of (D1·D2), after rounding, may be obtained, i.e., D=C·10^(E1+E2+x). At block 565, comparisons are made to determine whether D is an exact representation of the real product (D1·D2), i.e., whether x digits removed from the end of C* during rounding are all zeros. If f* is larger than 0 but smaller than 10^(−p), that result is exact may be outputted at block 575; otherwise, that result is inexact may be outputted at block 570. Process 500 may end at block 580.

Process 500 as shown in FIG. 5 for decimal floating-point multiplication in the rounding-down mode using hardware for binary number operations may be summarized as Property 3 below.

---

Property 3

C' = C1 · C2; /* binary integer multiplication */
q = the number of decimal digits required to represent C'; /* look up in a table */
if q ≤ p, the result D = C' · 10^(E1+E2) is exact;
else /* for cases where q ∈ [p+1, 2·p] */
{
    x = q − p; /* the number of decimal digits to be removed -continued Property 3

```
    from the lower part of C', x ∈ [1, p] */
Kx = 10^-x · (1 + □), 0 < □ < 2^-ceil(2·p·p); /* pre-calculated as
                                specified in Property 1 */
C* = C' · Kx = C' · k_x · 2^(-e_x); /* binary integer multiplication
                                with implied binary point */
C = floor(C*); /*logical right shift; C has p decimal digits,
                                calculated correctly by Property 1 */
f* = frac(C*); /* the fractional part of C*, consists of the lower
    e_x bits of the product C* */
D = C · 10^{E1+E2+x};
if 0 < f* < 10^-p, the result is exact;
else the result is inexact;
}
```

Similar to computations for Property 2, several parts of computations for Property 3 can also be carried out in parallel, for example computation of C'=C1·C2 and E=E1+E2 can be carried out in parallel, and so can test for q≦p and computation of x=q−p; reading ½·10x and kx from tables; computation of C and f* and E=E1+E2+x; and test for 0<f*<10^(−p) and encoding of the result. Also note that condition 0<f*<10^(−p) from Property 3 for exactness determination holds also if 10^(−p) is replaced by 10^(−x) or by Kx=10^(−x)·(1+ε).

In some situations, a rounding-to-zero may be mentioned/used. This mode is not treated separately here because for positive values it is identical to the rounding-down mode and for negative values it is identical to the rounding-up mode.

In the above, decimal multiplications in a rounding-to-nearest mode and in a rounding-down mode are disclosed along with FIGS. 2-5. A decimal multiplication result may also be rounded up. Since a decimal multiplication in the rounding-up mode works very similarly to a decimal multiplication in the rounding-down mode, no extra figures are provided for this mode. Instead, only differences between the rounding-down mode and the rounding-up are pointed out below.

Although calculation of the multiplication result, D, and exactness determination are identical to those carried out for the rounding-down as shown in FIGS. 4 and 5, the value D=floor(C'·Kx)·10^(E1+E2+x)=C·10^(E1+E2+x) is the final result only if the result calculated for the rounding-down mode is exact. If the result is inexact, then the result for the rounding-up needs to have C replaced by C=C+1. If C=10^p (rounding overflow), then both C and E need to be adjusted, i.e., C=10^(p−1), E=E+1=E1+E2+x+1, D=C·10^E.

Although an example embodiment of the disclosed subject matter is described with reference to block and flow diagrams in FIGS. 1-5, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A machine-implemented method for performing a decimal number multiplication between a first operand and a second operand using hardware for binary number operations, comprising:
    obtaining, using the hardware, a first coefficient and a second coefficient, said first coefficient being the integer coefficient of said first operand and said second coefficient being the integer coefficient of said second operand;
    performing a binary multiplication operation between said first coefficient and said second operand to obtain a first product, using a binary integer multiplier of the hardware;
    rounding the number of decimal digits in said first product to a pre-determined number of digits in a designated rounding mode to obtain a second product based on a comparison of the number of decimal digits in said first product with said pre-determined number of digits, wherein the rounding comprises: determining the number of decimal digits in said first product; using said first product as said second product, if the number of decimal digits in said first product is less than or equal to said pre-determined number of digits; and otherwise, converting said first product to said second product, and the converting comprises: calculating a difference (x) between the number of decimal digits in said first product and said pre-determined number of digits; obtaining a binary representation of $10^{(-x)}$; and if said designated rounding mode is either rounding-down or rounding-up, performing a binary integer multiplication between said first product and said binary representation of $10^{(-x)}$ to produce an intermediate product; and if said designed rounding mode is rounding-to-nearest, obtaining a binary representation of $(\frac{1}{2}*10^x)$, performing a binary addition between said first product and said binary representation of $(\frac{1}{2}*10^x)$, and performing a binary integer multiplication between the result of said binary addition and said binary representation of $10^{(-x)}$ to produce said intermediate product;
    obtaining, using the hardware, a result for said decimal number multiplication based at least in part on said second product;
    and determining whether said result is exact.

2. The method of claim 1, wherein obtaining a first coefficient and a second coefficient comprises converting said first coefficient and said second coefficient to binary format, if said first coefficient and said second coefficient are not in binary format.

3. The method of claim 1, wherein said designated rounding mode comprises one of rounding-to-nearest, rounding-down, or rounding-up.

4. The method of claim 1, wherein obtaining a result for said decimal number multiplication comprises if said second product equals to said first product,
    performing an addition operation between the exponent of said first operand and the exponent of said second operand to produce a final exponent; outputting said result with a coefficient being said first product and an exponent being said final exponent; and
    indicating that said result is exact.

5. The method of claim 1, wherein converting said first product to said second product further comprises performing a binary shift operation to said intermediate product to obtain said second product and to produce a floor number and a fractional number, said binary shift operation right shifting said intermediate product by the number of bits in said binary representation of $10^{(-x)}$, said floor number being the coefficient of said second product, said fractional number including bits being shifted out from said intermediate product.

6. The method of claim 5, wherein obtaining a result for said decimal number multiplication comprises:
    adding the exponent of said first operand, the exponent of said second operand, and x together to produce an exponent for said result;
    if said designated rounding mode is rounding-to-nearest, performing midpoint detection based on said floor number and said fractional number,
        adjusting said floor number if said first product is determined as a midpoint, and
        determining whether there is rounding overflow, and if there is, adjusting said floor number and said exponent; and
    producing said result for said decimal number multiplication with a coefficient being said floor number and an exponent being said exponent.

7. The method of claim 5, wherein determining whether said result is exact comprises:
    performing comparison operations between said fractional number and a first constant and a second constant; and
    if said fractional number is larger than said first constant but smaller than said second constant, indicating that said result is exact, otherwise indicating that said result is inexact.

8. The method of claim 7, wherein obtaining a result for said decimal number multiplication further comprises if said designated rounding mode is rounding-up,
    increasing the coefficient of said result by 1 if said result is inexact;
    determining whether the coefficient of said result overflows after said increasing; and
    if the coefficient of said result overflows, adjusting the coefficient and the exponent of said result.

9. A processor comprising a decimal multiplication module for performing a decimal number multiplication between a first operand and a second operand, said decimal multiplication module including:
    at least one binary integer multiplier to perform a binary multiplication between the integer coefficient of said first operand and the integer coefficient of said second operand to obtain a first product;
    a decimal digit number identifier to determine the number of decimal digits in said first product;
    a rounding module to round the number of decimal digits in said first product to a pre-determined number of digits in a designated rounding mode to obtain a second product, wherein said rounding module is adapted to determine the number of decimal digits in said first product; to compare the number of decimal digits in said first product with said pre-determined number of digits; and if the number of decimal digits of said first product is more than said pre-determined number of digits, to calculate a difference (x) between the number of decimal digits in said first product and said pre-determined number of digits, and to obtain a binary representation of $10^{(-x)}$;

at least one adder to produce a result for said decimal multiplication, based in part on said second product, wherein said rounding module is adapted to further obtain a binary representation of (½*10^(x)) and inform said adder to perform a binary addition between said first product and said binary representation of (½*10^(x)) to produce an intermediate product if said designated rounding mode is rounding-to-nearest, and wherein said binary integer multiplier is adapted to perform a binary multiplication between said first product and said binary representation of 10^(−x) to produce said second product if said designated rounding mode is either rounding-down or rounding-up; and an exactness detector to determine whether said result is exact.

10. The processor of claim 9, wherein said adder is adapted to obtain a result for said decimal multiplication, if the number of decimal digits of said first product is less than or equals to said pre-determined number of digits, by adding the exponent of said first operand and the exponent of said result, the coefficient of said result being said first product.

11. The processor of claim 9, wherein said binary integer multiplier is adapted to perform a binary multiplication between said intermediate product and said binary representation of 10^(−x) to produce said second product, if said designated rounding mode is rounding-to-nearest.

12. The processor of claim 11, wherein said decimal multiplication module further comprising a binary shifter adapted to perform shift operations on said second product to obtain a floor number and a fractional number by right shifting said second product by the number of bits in said binary representation of 10^(−x).

13. The processor of claim 12, wherein said decimal multiplication module further comprising a midpoint detector, if said designated rounding mode is rounding-to-nearest, to detect whether said first product is a midpoint; and to adjust said floor number if said first product is a midpoint.

14. The processor of claim 13, wherein said adder is further adapted to add x, the exponent of said first operand, and the exponent of said second operand to produce an exponent for said result of said decimal number multiplication, the coefficient of said result being said floor number.

15. The processor of claim 14, wherein said exactness detector is adapted to adjust the coefficient and the exponent of said result of said decimal number multiplication if there is rounding overflow when said designated rounding mode is rounding-to-nearest; and to determine whether said result for said decimal number multiplication is exact by comparing said fractional number with at least one constant.

16. The processor of claim 15, wherein said exactness detector, if said designated rounding mode is rounding-up, is further adapted to increase the value of the coefficient of said result for said decimal number multiplication by 1 if said result is inexact; to determine whether the coefficient of said result overflows if the coefficient of said result is increased by 1; and if the coefficient of said result overflows, to adjust the coefficient and the exponent of said result.

17. A computing system, comprising:
a synchronous dynamic random access memory ("SDRAM"); and
at least one processor coupled to access said SDRAM via a system interconnect, said processor having a decimal multiplication module, said decimal multiplication module including:

at least one binary integer multiplier to perform a binary multiplication between the integer coefficient of a first operand and the integer coefficient of a second operand to obtain a first product, a decimal digit number identifier to determine the number of decimal digits in said first product, a rounding module to round the number of decimal digits in said first product to a pre-determined number of digits in a designated rounding mode to obtain a second product, wherein said rounding module is adapted to determine the number of decimal digits in said first product; to compare the number of decimal digits in said first product with said pre-determined number of digits; and if the number of decimal digits of said first product is more than said pre-determined number of digits, to calculate a difference (x) between the number of decimal digits in said first product and said pre-determined number of digits, and to obtain a binary representation of 10^(−x), at least one adder to produce a result for said decimal multiplication, based in part on said second product, wherein said rounding module is adapted to further obtain a binary representation of (½*10^(x)) and inform said adder to perform a binary addition between said first product and said binary representation of (½*10^(x)) to produce an intermediate product if said designated rounding mode is rounding-to-nearest, and wherein said binary integer multiplier is adapted to perform a binary multiplication between said first product and said binary representation of 10^(−x) to produce said second product if said designated rounding mode is either rounding-down or rounding-up, and an exactness detector to determine whether said result is exact.

18. The system of claim 17, wherein said adder is adapted to obtain a result for said decimal multiplication, if the number of decimal digits of said first product is less than or equals to said pre-determined number of digits, by adding the exponent of said first operand and the exponent of said result, the coefficient of said result being said first product.

19. The system of claim 17, wherein said binary integer multiplier is adapted to perform a binary multiplication between said intermediate product and said binary representation of 10^(−x) to produce said second product, if said designated rounding mode is rounding-to-nearest.

20. The system of claim 19, wherein said decimal multiplication module further comprising a binary shifter adapted to perform shift operations on said second product to obtain a floor number and a fractional number by right shifting said second product by the number of bits in said binary representation of 10^(−x).

21. The system of claim 20, wherein said decimal multiplication module further comprising a midpoint detector, if said designated rounding mode is rounding-to-nearest, to detect whether said first product is a midpoint; and to adjust said floor number if said first product is a midpoint.

22. The system of claim 21, wherein said adder is further adapted to add x, the exponent of said first operand, and the exponent of said second operand to produce an exponent for said result of said decimal number multiplication, the coefficient of said result being said floor number.

23. The system of claim 22, wherein said exactness detector is adapted to adjust the coefficient and the exponent of said result of said decimal number multiplication if there is rounding overflow when said designated rounding mode is rounding-to-nearest; and to determine whether said result for said decimal number multiplication is exact by comparing said fractional number with at least one constant.

24. The system of claim 23, wherein said exactness detector, if said designated rounding mode is rounding-up, is further adapted to increase the value of the coefficient of said result for said decimal number multiplication by 1 if said result is inexact; to determine whether the coefficient of said result overflows if the coefficient of said result is increased by 1; and if the coefficient of said result overflows, to adjust the coefficient and the exponent of said result.

* * * * *